United States Patent [19]

Kroner et al.

[11] 3,743,882

[45] July 3, 1973

[54] CIRCUIT ARRANGEMENT FOR GENERATING AN AMPLITUDE-MODULATED SAWTOOTH VOLTAGE

[75] Inventors: Klaus Kroner, Hamburg; Hans-Heinrich Feindt, Schenefeld, both of Germany

[73] Assignee: U.S. Philips Corporation, New York, N.Y.

[22] Filed: Oct. 6, 1971

[21] Appl. No.: 186,910

[30] Foreign Application Priority Data

Oct. 15, 1970 Germany .................. P 20 50 668.7

[52] U.S. Cl. ....... 315/13 C, 315/27 GD, 315/27 TD

[51] Int. Cl. ............................................ H01j 29/50

[58] Field of Search ...................... 315/13 C, 27 GD, 315/27 TD

[56] References Cited

UNITED STATES PATENTS

| | | | |
|---|---|---|---|
| 3,613,108 | 10/1971 | Spannhake | 315/13 C |
| 3,648,099 | 3/1972 | Otten et al. | 315/27 GD |
| 3,688,153 | 8/1972 | Wheatley | 315/27 TD |
| 2,958,003 | 10/1960 | Marshall, Jr. | 315/27 TD |
| 3,139,538 | 6/1964 | Geller | 315/27 TD |
| 3,273,007 | 9/1966 | Schneider | 315/27 TD |
| 3,489,948 | 1/1970 | Buechel | 315/27 TD |
| 3,582,706 | 6/1971 | Thomas | 315/27 TD |
| 3,629,497 | 12/1971 | Soardi et al. | 315/27 TD X |

*Primary Examiner*—Carl D. Quarforth
*Assistant Examiner*—P. A. Nelson
*Attorney*—Frank R. Trifari

[57] ABSTRACT

A circuit arrangement for generating an amplitude-modulated sawtooth voltage of line frequency modulated in amplitude by a voltage of field frequency, particularly for the corner convergence in a colour television display apparatus. A capacitor is charged by a voltage pulse of line frequency and is discharged by a current which is proportional to the instantaneous value of a sawtooth voltage of field frequency.

6 Claims, 6 Drawing Figures

Patented July 3, 1973 3,743,882

2 Sheets-Sheet 1

INVENTORS

KLAUS KRONER
BY HANS-HEINRICH FEINDT

AGENT

INVENTORS
KLAUS DRONER
HANS-HEINRICH FEINDT
BY
Frank R. Trifari
AGENT

CIRCUIT ARRANGEMENT FOR GENERATING AN AMPLITUDE-MODULATED SAWTOOTH VOLTAGE

The invention relates to a circuit arrangement for generating an amplitude-modulated sawtooth voltage, particularly for the 110° corner convergence in colour television display apparatus.

Circuit arrangements for amplitude modulation are known in which the (first) signal to be modulated is applied to the grid of an amplifier value (hexode). A second signal with which the first signal is to be modulated is applied to a second grid of this valve.

For known reasons it is desirable to replace valve circuits by transistor circuits. In this case it is, however, not possible to use the said principle of two-grid modulation for transistor circuits.

An object of the present invention is to produce amplitude modulation by means of a transistor circuit arrangement.

According to the invention this is achieved in a simple manner in that the positive (negative) part of a voltage pulse of line frequency is applied via a diode of corresponding polarity to a first end of a capacitor the other end of which is connected to the base of an npn- (pnp-) transistor whose emitter is connected to earth and whose collector is connected through a resistor to the said first end of the capacitor, the input for a sawtooth voltage of field frequency being connected via another resistor to the base of the transistor and the modulated sawtooth voltage at the first end of the capacitor being derived from the modulator circuit. The pulsatorily charged capacitor is then discharged at a current which is proportional to the instantaneous value of the sawtooth voltage so that a more or less steeply trailing edge is produced in the capacitor.

In order to be able to modulate sawtooth voltages independently of their polarity, two of the said modulator circuits, whereby each one can only be operated with either positive or negative pulses, are combined to form a symmetrical circuit in a further embodiment according to the invention. Furthermore it is possible to produce corresponding parabola voltages by integration of the modulated sawtooth voltage.

In order that the invention may be readily carried into effect some embodiments thereof will now be described in detail by way of example with reference to the accompanying diagrammatic drawings in which.

Figure 1:
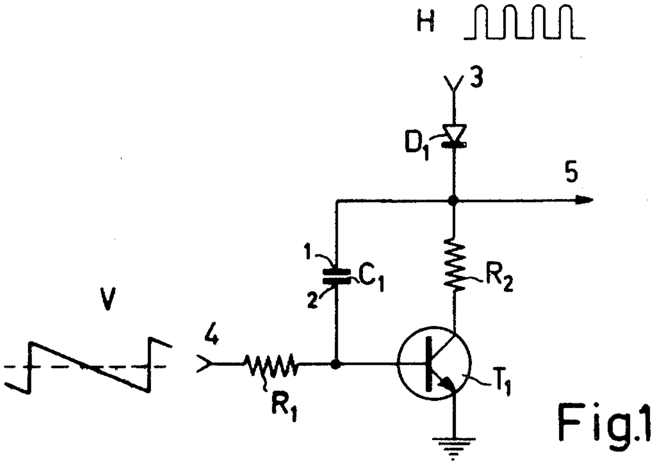
FIG. 1 shows the principle circuit diagram according to the invention.

In FIG. 1 the input 3 for the voltage pulses of line frequency is connected to the anode of diode $D_1$ (BAX 13). The cathode of diode $D_1$ is connected to the end 1 of capacitor $C_1$ (1 nF). Furthermore the end 2 of capacitor $C_1$ is connected at one end through the resistor $R_1$ (15 kΩ) to the input 4 for the sawtooth voltage of field frequency and at the other end to the base electrode of transistor $T_1$ (BC 107) whose emitter is connected to earth and whose collector is connected through resistor $R_2$ (4.7 kΩ) to the end 1 of capacitor $C_1$. The modulated signal is derived from the output 5 which is connected to the end 1 of capacitor $C_1$.

The circuit arrangement operates in accordance with the following principle:

The end 1 of capacitor $C_1$ is positively charged with respect to earth via diode $D_1$ by the positive voltage pulses. When a positive direct voltage is present at the input 4, a positive current flows through resistor $R_1$ to both the base electrode of transistor $T_1$, which renders this transistor conducting, and to the end 2 of capacitor $C_1$. Since the diode $D_1$ is blocked during the period between the positive voltage pulses of line frequency, the capacitor is discharged via the collector-emitter path of transistor $T_1$. The amplification of transistor $T_1$ is high (for example, higher than 50) so that the base-emitter current, as compared with the collector-emitter current, is negligible. This means that substantially the entire current flows from input 4 to capacitor $C_1$ as a discharge current. This discharge current, which depends on the direct voltage at input 4 and on the value of resistor $R_1$ and not on the charge condition of capacitor $C_1$, discharges capacitor $C_1$ between two positive voltage pulses of line frequency in a purely linear manner. The degree of discharge and hence the voltage amplitude at the end 1 of capacitor $C_1$ thus only depends on the direct voltage at input 4 and on the value of resistor $R_1$. Resistor $R_2$ prevents the positive pulse current from flowing to the collector instead of to capacitor $C_1$ when diode $D_1$ is conducting.

If a sawtooth voltage of field frequency instead of a direct voltage is applied to input 4 of the circuit arrangement, a field-frequency amplitude modulation of the sawtooth voltages of line frequency occurring at the end 1 of capacitor $C_1$ is obtained.

Figure 2:
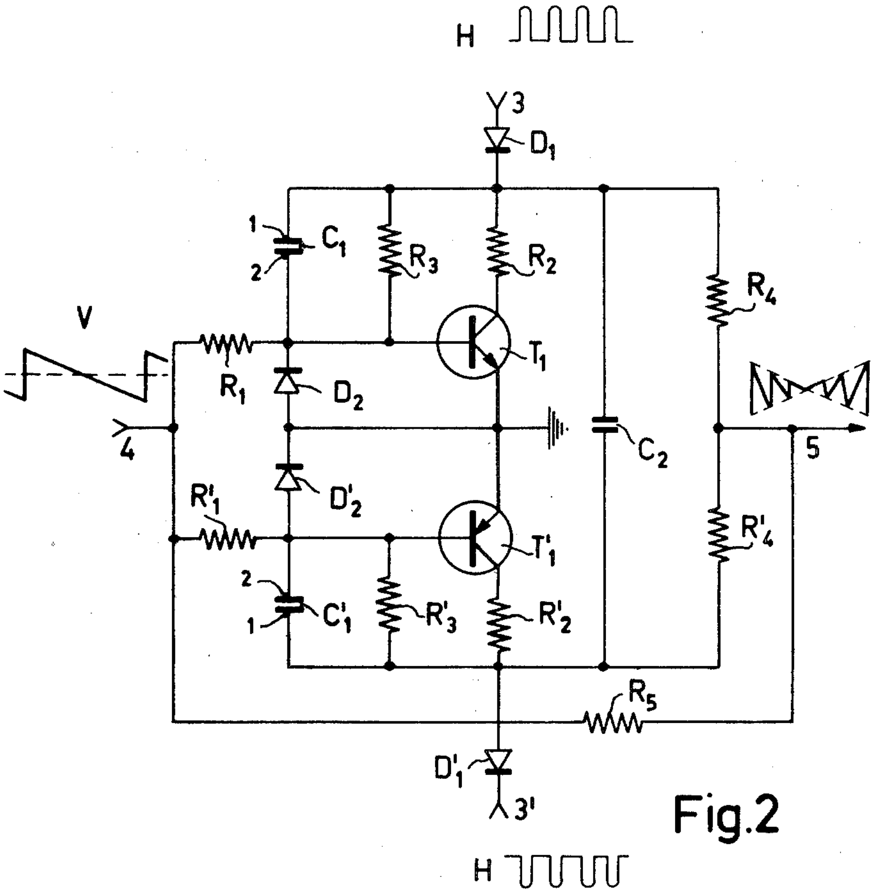
FIG. 2 shows a practical embodiment for generating a correction voltage for the corner convergence.

FIG. 2 shows a practical embodiment according to the invention which is used for generating a correction voltage for the corner convergence in colour television display apparatus. The circuit shown in FIG. 1 has been extended to a symmetrical circuit by means of a corresponding circuit using a pnp-transistor in order to integrate both the positive and the negative voltage pulses of line frequency and to modulate them at the field frequency. The positive and the negative part of the voltage pulse of line frequency reaches the end 1 of capacitor $C_1$ and the end 1 of capacitor $C'_1$ via the inputs 3 and 3' and the diodes $D_1$ and $D'_1$, respectively, of corresponding polarity, and these parts charge said capacitors. The end 2 of capacitor $C_1$ and the end 2 of capacitor $C'_1$ are connected at one end through resistors $R_1$ and $R'_1$, respectively, to the input 4 and at the other end to the bases of npn-transistors $T_1$ and pnp-transistor $T'_1$, respectively. The end 1 of capacitor $C_1$ and the end 1 of capacitor $C'_1$ are connected via resistors $R_2$ and $R'_2$, respectively, to the collectors of transistor $T_1$ and $T'_1$, respectively. The emitters of transistors $T_1$ and $T'_1$ are connected to earth. Furthermore the base of transistor $T_1$ is connected to the cathode of diode $D_2$ (BAX 13) and the base of transistor $T'_1$ is connected to the anode of diode $D'_2$ (BAX 13), while the anode of diode $D_2$ and the cathode of diode $D'_2$ are connected to earth. Capacitor $C_1$ is connected in parallel with resistor $R_3$ (470 kΩ) and capacitor $C'_1$ is connected in parallel with resistor $R'_3$ (470 kΩ). Furthermore the end 1 of capacitor $C_1$ is connected via capacitor $C_2$ (0.1 μF) to the end 1 of capacitor $C'_1$. The end 1 of capacitor $C_1$ is connected via resistor $R_4$ (10 kΩ) to the output 5, while the end 1 of capacitor $C'_1$ is connected via resistor $R'_4$ (10 kΩ) to the output 5. Finally input 4 is connected via resistor $R_5$ (3.0 kΩ) to output 5.

Figures 3, 4, 5, 6:
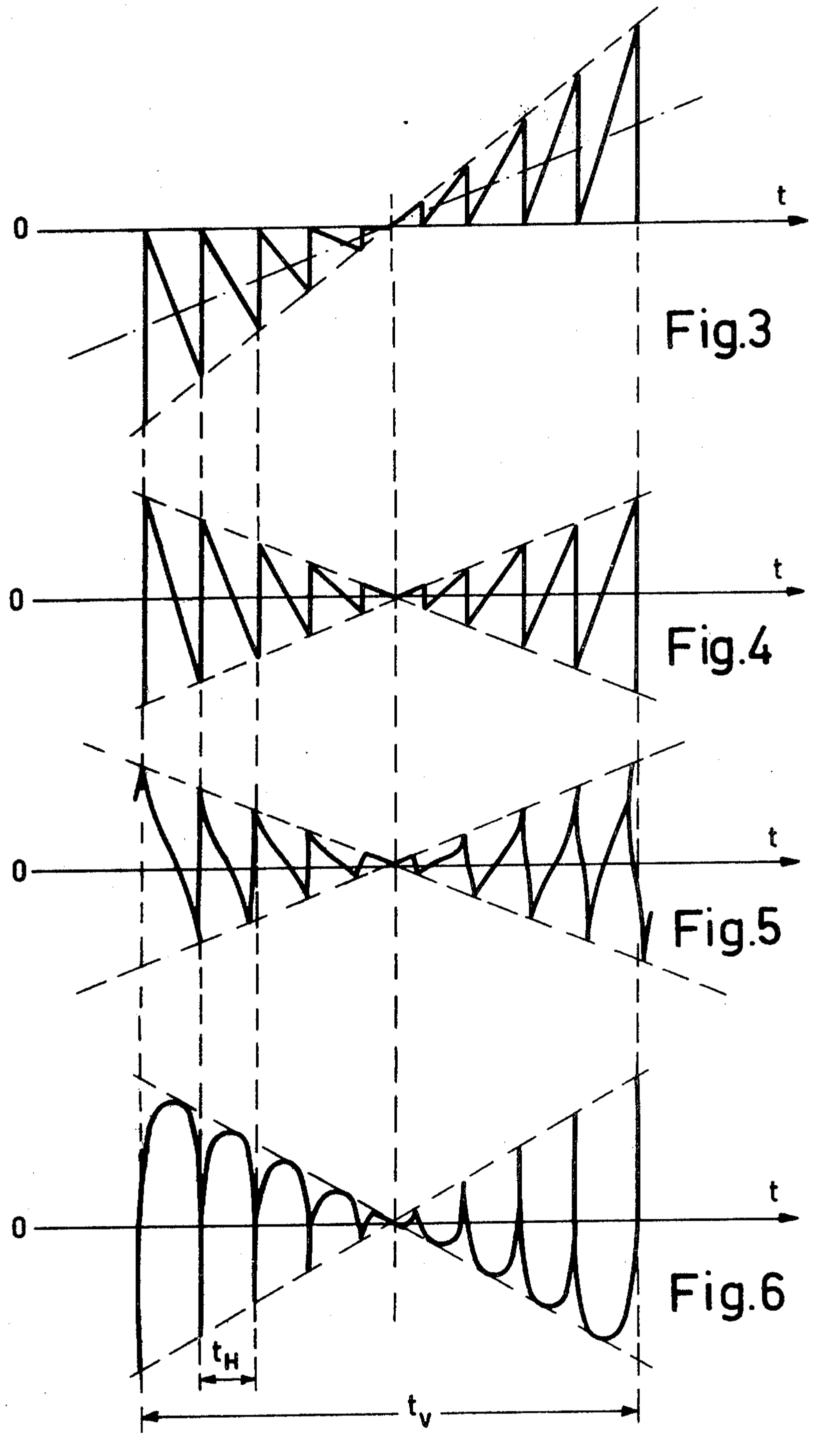
FIGS. 3 to 6 show sawtooth waveforms which may be produced by the circuit arrangement according to the invention.

The partial circuit in the upper half of FIG. 2 operates during the period when the positive part of the sawtooth voltage of field frequency is present at the output 4. The function of this partial circuit has been described with reference to FIG. 1. This circuit is completed by the section of the circuit shown in the lower half of FIG. 2 which section starts to operate when the negative part of the sawtooth voltage of field frequency is present at the input 4. In this part of the circuit the npn-transistor $T_1$ is replaced by a pnp-transistor $T'_1$; the further structure and the manner of operation corresponds to the circuit arrangement of FIG. 1. Capacitor $C_1$ is charged via diode $D_1$ with positive voltage pulses of line frequency, whereas capacitor $C'_1$ is charged via diode $D'_1$ with negative voltage pulses of line frequency. Dependent on whether the sawtooth voltage of field frequency at input 4 is negative or positive, capacitor $C_1$ or $C'_1$ is discharged via transistor $T_1$ or $T'_1$ and a sawtooth voltage having a positive or negative slope is produced as is shown in FIG. 3. The sawtooth pulse is not noticeably influenced by the resistors $R_3$ and $R'_3$ which serve to fix the transistor bias voltages. Diodes $D_2$ and $D'_2$ prevent the bases of transistors $T_1$ and $T'_1$ from being loaded with an inadmissibly high cut-off voltage. Capacitor $C_2$ of large value ensures that in case of a recharge of capacitor $C_1$ due to the discharge current flowing through $R_1$, capacitor $C'_1$ is simultaneously recharged and conversely. As a result the same sawtooth voltage is present at both the end 1 of capacitor $C_1$ and at the end 1′ of capacitor $C'_1$, but only with different mean values of the direct voltage. The resistors $R_4$ and $R'_4$ serve to set the mean value of the direct voltage of the output signal at 0 Volt. The sawtooth voltage of field frequency from input 4 is added via resistor $R_5$ to the output signal shown in FIG. 3 so that the desired field-frequency modulated output signal shown in FIG. 4 can finally be derived from the circuit arrangement according to FIG. 2.

When resistors $R_4$ and $R'_4$ are replaced by capacitors of, for example, 1 nF and when correspondingly resistor $R_5$ is replaced by a capacitor of 3 nF, the same signal is the result but without a defined mean value of the direct voltage. Capacitor $C_2$ may also be omitted in this case.

A sawtooth pulse of line frequency shown in FIG. 5 is required as a correction voltage for the purpose of corner convergence, while the variation of the sawtooth of this pulse, in addition to an amplitude modulation of field frequency, must have a steeper variation at the beginning and at the end than in the centre, or conversely. Such a desired third power component may be added to or subtracted from the sawtooth variation of line frequency by superimposing a parabola voltage of line frequency on the sawtooth voltage of field frequency at the input 4 of the circuit arrangement according to FIG. 2. Such an additional parabola voltage of line frequency, which is shown in FIG. 6, must likewise be field-frequency modulated in amplitude and polarity. This voltage variation is obtained in a circuit arrangement according to FIG. 2 when the modulated sawtooth voltage at the output 5 is integrated. This may be obtained, for example, by arranging a capacitor of approximately 10 nF after the output 5 or by a suitable integration circuit such as a Miller integrator. The second circuit arrangement according to FIG. 2 required for this purpose for producing the parabola voltage of line frequency may be omitted when the modulated signal at the output 5 is superimposed on the sawtooth voltage of field frequency at the input 4 after a separate integration and when the ultimate correction voltage is derived from the output 5 prior to the integration circuit arranged after said output.

What is claimed is:

1. A circuit comprising a first diode having a first electrode adapted to receive a television line frequency pulse, and a second electrode; a first capacitor having a first end coupled to said diode second electrode, and a second end; a first transistor having an emitter electrode coupled to ground, a base electrode coupled to said capacitor second end, and a collector electrode; a first resistor having a first end coupled to said base, and a second end adapted to receive a television field frequency sawtooth waveform voltage; a second resistor having a first end coupled to said collector, and a second end coupled to said capacitor first end; and output means coupled to said capacitor first end for providing an output signal of a line frequency sawtooth waveform having a field frequency varying amplitude envelope.

2. A circuit as claimed in claim 1 wherein said diode first and second ends comprise an anode and cathode respectively, said pulses comprise positive pulses, said transistor comprises an npn type transistor, and further comprising a second diode having a cathode adapted to receive negative television line frequency pulses, and an anode; a second capacitor having a first end coupled to said second diode anode, and a second end; a pnp type second transistor having an emitter electrode coupled to ground, a base electrode coupled to said second capacitor second end, and a collector electrode; a third resistor having a first end coupled to said second transistor base, and a second end adapted to receive said field frequency sawtooth waveform voltage; a fourth resistor having a first end coupled to said second transistor collector, and a second end coupled to said second capacitor first end; and said output means being coupled to said second capacitor first end; whereby said output signal has both positive and negative portions.

3. A circuit as claimed in claim 2 further comprising a fifth resistor having a first end adapted to receive said field frequency voltage, and a second end coupled to said output means.

4. A circuit as claimed in claim 2 wherein said second ends of said first and third resistors are adapted to further receive a field frequency modulated line frequency parabola voltage.

5. A circuit as claimed in claim 4 further comprising an integrator coupled to said output.

6. A circuit as claimed in claim 2 further comprising a third capacitor coupled between said first diode cathode and said second diode anode.

* * * * *